Aug. 22, 1961 A. ZEITLIN ET AL 2,997,351
HYDRAULIC CYLINDER SEAL
Filed Oct. 15, 1958 2 Sheets-Sheet 2

INVENTORS.
ALEXANDER ZEITLIN
JACOB BRAYMAN
BY
their ATTORNEYS.

United States Patent Office 2,997,351
Patented Aug. 22, 1961

2,997,351
HYDRAULIC CYLINDER SEAL
Alexander Zeitlin, White Plains, and Jacob Brayman, Staten Island, N.Y., assignors to Engineering Supervision Company, New York, N.Y., a corporation of New York
Filed Oct. 15, 1958, Ser. No. 767,462
9 Claims. (Cl. 309—2)

This invention relates to hydraulic cylinder seals and, more particularly, to a new and improved seal especially adapted for use in large diameter, high pressure hydraulic cylinders.

In hydraulic presses used for forging, extrusion, deep drawing and the like, a ram member driven in a cylinder by fluid under pressure is utilized to exert force on the material being formed. A bushing supported by the cylinder wall guides the ram member as it moves in the cylinder while a flange formed at one end of the bushing supports packing within a recess in the cylinder wall to prevent fluid from escaping through the clearance between the ram and the cylinder.

Customarily, the bushing is made slightly larger than the diameter of the cylinder to form a press fit when mounted therein. The retaining flange, however, usually fits loosely within the recess in the cylinder wall and under high pressures the packing material tends to extrude into the gap between the flange and the cylinder wall, forcing the bushing against the ram member. Furthermore, when high pressure is applied, the cylinder tends to expand or "breathe," increasing the gap between the retaining flange and the cylinder wall thereby allowing more packing material to be forced between the two. In addition, when the cylinder breathes in this manner, the main portion of the bushing, which forms a press fit with the cylinder wall, expands with the cylinder while the retaining flange, being thicker and more rigid, resists the expansion. As a result, the inside edge of the flange is bent inwardly against the ram member, producing excessive friction and rapidly wearing away the bushing as the ram moves in the cylinder to form another gap into which the packing material can be extruded.

Accordingly, it is an object of this invention to provide a new and improved hydraulic cylinder seal formed without gaps into which packing material can be forced.

Another object of the invention is to provide a hydraulic cylinder seal which does not bend against the ram member when the cylinder breathes.

A further object of the invention is to provide a hydraulic cylinder seal especially adapted for use with split bushings.

These and other objects of the invention are accomplished by providing a bushing flange which forms a tight fit with the recessed portion of the cylinder wall adjacent the packing material. In one embodiment of the invention, the flange is integral with the main portion of the bushing and the junction between the two portions is made sufficiently flexible by an undercut groove so that both parts of the bushing can form a press fit with the cylinder wall and its recess. In another embodiment, the main portion of the bushing and the retaining flange are separate parts and each is press fitted against the corresponding portion of the cylinder wall while a third embodiment utilizes a compressible retaining flange which is normally larger than the recess in the cylinder wall so that a tight fit is provided between the two.

Further objects and advantages of the invention will be apparent from a reading of the following description in conjunction with the accompanying drawings in which.

Figures 1, 2:
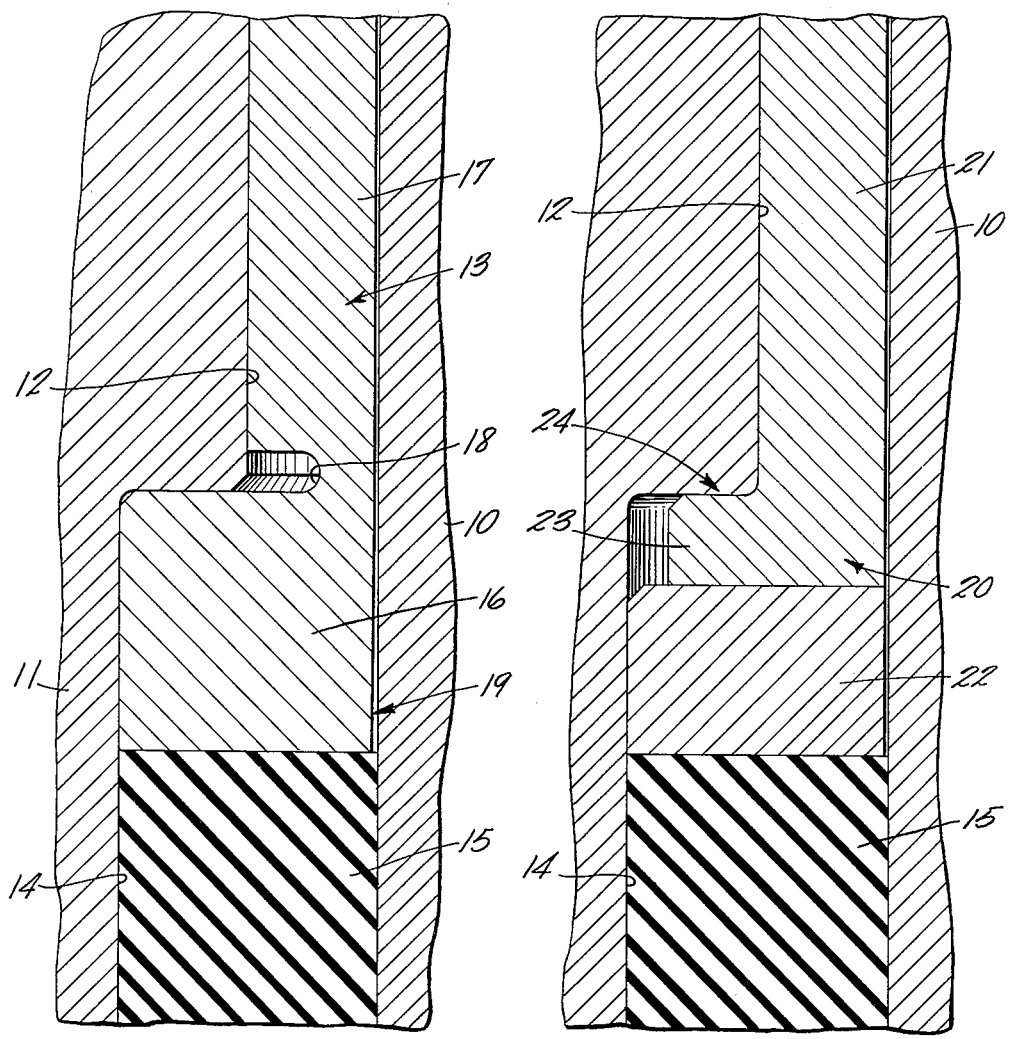
FIG. 1 is a fragmentary sectional view of a typical hydraulic cylinder illustrating one form of cylinder seal arranged according to the invention.
FIG. 2 is a similar view showing another type of cylinder seal.

As illustrated in FIG. 1, a ram member 10 is positioned within a hydraulic cylinder 11 having a bushing support wall 12 supporting a bushing 13 and a recessed wall 14 of larger diameter wherein packing 15 is positioned in the usual manner. Although only one portion of the boundary between the ram 10 and the cylinder 11 is illustrated in the sectional view of FIGS. 1 and 2, it will be understood that the cylinder 11, bushing 13, and packing 15 surround the ram 10 to form a bore through which the ram member is slidable in the conventional manner. Preferably, the bushing 13, which guides the motion of the ram in the cylinder 11, is made of bronze or the like to reduce friction, while the packing 15 is composed of a flexible material such as rubber so that a light pressure applied between the bushing 13 at one end and a gland (not shown) at the other end forces it against the ram 10 and the recessed wall 14 to form a liquid-tight seal.

In order to retain the packing material 15 within the recessed portion of the cylinder, the bushing 13 includes an integral retaining flange 16 projecting into the recessed portion and extending from the wall 14 to the ram 10 while the main portion 17 of the bushing extends from the wall 12 to the ram member. Customarily, the main portion of bushings of this type is dimensioned to form a press fit with the cylinder wall 12 but inasmuch as it is extremely difficult to press fit two pieces at two different diameters, conventional bushings are usually dedesigned to leave a clearance between the flange portion 16 and the recessed wall 12. As described above, this clearance permits the packing material 15 to be forced between the cylinder wall and the retaining flange of the bushing, driving the inside edge of the flange against the ram.

In the present hydraulic cylinder seal, this difficulty is eliminated by reducing the bushing thickness at the junction between the retaining flange 16 and the main portion 17 as by an undercut groove 18, as shown in FIG. 1. In this manner, the junction between the two portions of the bushing is made sufficiently flexible so that both portions can be press fitted against the two cylinder walls 12 and 14. To this end, the outside diameter of the retaining flange 16 is made slightly larger than the recessed wall 14 so that, after assembly, no gap appears between the two and the packing material 15 cannot be forced between them. It will be readily apparent that since the junction between the two portions of the bushing is made flexible according to the invention by reducing its thickness, the tendency of the retaining flange to bend inwardly against the ram member when the main portion 17 of the bushing expands more than the flange 16 during breathing is substantially eliminated. Also, in order to further reduce the possibility of frictional contact between the flange 16 and the ram member 10 caused in this manner by differential breathing, a slightly tapered chamfer 19 may be provided along the inside edge of the retaining flange.

In operation, when hydraulic pressure is applied to the ram member 10, driving it axially in the cylinder, fluid passing between the walls of the ram 10 and the cylinder 11 forces the packing 15 against the retaining flange 16. Inasmuch as the press fit provides no clearance between the flange and the recessed wall 14, the packing material is effectively blocked and cannot be extruded between the two. Furthermore, when the cylinder walls breathe as a result of the application of hydraulic pressure, the flange 16 tends to expand with the wall 14 since it has a slightly larger diameter, thus substantially eliminating the gap opened by breathing between the flange and the cylinder wall of conventional seals. If, as a result of differential breathing of the two portions 16 and 17 of the bushing, the retaining flange 16 is tilted toward the ram 10, the tapered chamfer 19 prevents excessive frictional contact between these two parts.

For convenience in manufacture and assembly, the bronze bushing may be made in two parts, each forming a press fit with the corresponding wall 12 or 14. Thus, as illustrated in FIG. 2, a bushing 20 may comprise a sleeve portion 21 for guiding the ram member 10 and a retaining flange portion 22 having a diameter slightly larger than that of the wall 14 to form a press fit therewith and prevent the packing 15 from being forced between the two. As shown in the drawings, the retaining flange 22 extends from the recessed wall 14 to the ram 10 adjacent the packing 15 while the sleeve portion 21 is press fitted to the wall 12 and extends between this wall and the ram 10. In this manner, it is not necessary to press fit a single bushing at two different diameters on the cylinder wall. If desired, the bushing sleeve 21 may terminate in an enlarged portion 23 abutting the shoulder 24 at the end of the recessed portion of the cylinder.

In operation, since there is no gap between the retaining flange 22 and the wall 14, the packing material 15 cannot be forced between these two members when hydraulic pressure is applied. Furthermore, because of the press fit, the flange 22 tends to expand with the wall 14 when the cylinder breathes under pressure, thus preventing any appreciable gap from being opened at that point. Also, inasmuch as the sleeve portion 21 and the flange portion 22 are independent elements in this bushing, differential breathing of the two does not tend to bend the retaining flange inwardly against the ram.

Figure 3:
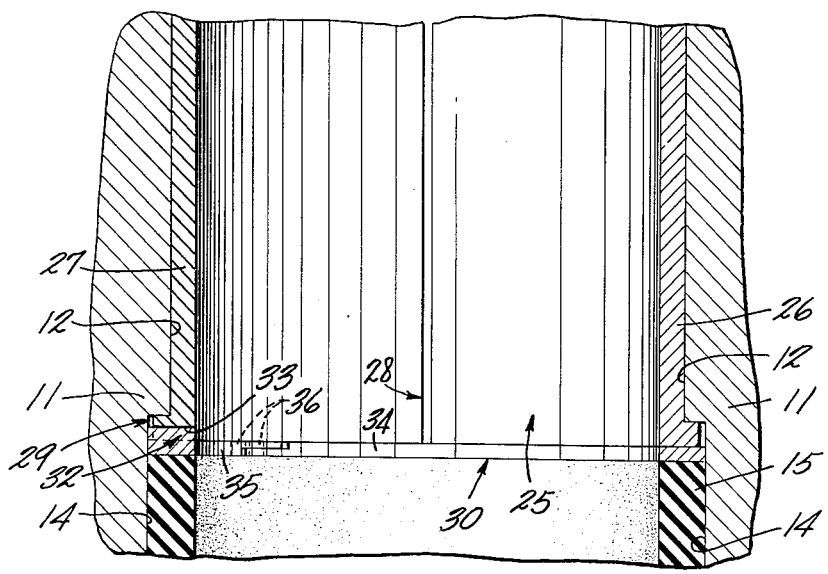
FIG. 3 is a cross-sectional view through a hydraulic cylinder illustrating a split bushing and a compressible retaining flange according to the invention.

Frequently, in order to facilitate the replacement of worn bushings, a split bushing 25 formed in two half parts 26 and 27, as shown in FIG. 3, is utilized. In this case, two gaps 28 are necessarily left between the two half portions and when hydraulic pressure is applied the packing 15 is forced into these gaps as well as into the clearance 29 between the recessed wall 14 and the flange of the bushing. This undesirable extrusion is prevented according to the invention by providing a separate flexible retaining flange 30 positioned between the bushing 25 and the packing 15.

Figure 4:
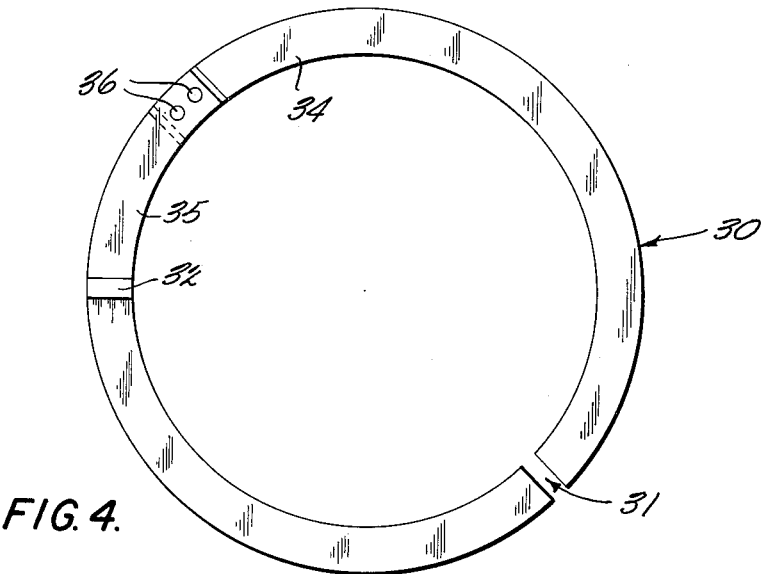
FIG. 4 is a plan view of the retaining flange shown in FIG. 3.

As best seen in FIG. 4, the flexible retaining flange 30 is formed with a gap 31 permitting it to be compressed to fit into the recessed portion of the cylinder 11, its normal diameter being slightly greater than that of the recessed wall 14. In order to prevent the retaining flange 30 from being turned during operation to an angular position at which the gap 31 is in line with one of the gaps 28 between the two halves of the bushing, the flange is formed with a key 32 which projects into a radial slot 33 in the bushing, thus holding the gap 31 at an angular position different from that of the gaps 28.

In certain hydraulic presses, it may be impossible to insert a retaining flange 30 of this type in one piece without completely disassembling the press. In this case, the flange 30 may be made in two parts 34 and 35 arranged to be joined by dowel pins 36 after they have been inserted in the cylinder cavity.

In operation, when hydraulic pressure is applied to drive a ram (not illustrated in FIG. 3) in the cylinder 11 provided with the split bushing 25, the retaining flange 30 prevents the packing 15 from being extruded into the gaps 28 between the halves of the bushing. In addition, since the retaining flange is normally larger than the recessed cylinder wall 14, it forms a tight fit with the wall and keeps the packing from being forced in the clearance 29 between the bushing 25 and the wall 14. Also, any packing forced into the gap 31 in the retaining flange is blocked by the bushing, the gaps 31 and 28 being positioned with an angular separation by the key 32 and slot 33. As the cylinder wall 14 breathes under pressure, the retaining flange, being flexible and normally larger than the wall diameter, expands with the wall maintaining a tight fit therewith to prevent extrusion of the packing into the clearance 29. Furthermore, since the retaining flange is a separate element rather than being integral with the bushing, differential breathing of these two parts does not tend to bend the flange inwardly against the ram.

Although the invention has been described herein with reference to specific embodiments, many modifications and variations therein will readily occur to those skilled in the art. Accordingly, all such modifications and variations are included within the intended scope of the invention as defined by the following claims.

We claim:

1. A hydraulic cylinder seal to prevent fluid from passing between the walls of a hydraulic cylinder and a ram member movable therein comprising non-metallic, extrudable packing means supported between the ram member and a first cylinder wall, bushing means mounted between the ram member and a second cylinder wall spaced from the first, and retaining flange means positioned between the bushing means and the packing means extending between the ram member and the first cylinder wall and forming a tight fit with the first cylinder wall so as to prevent the packing means from being extruded between the flange means and the first cylinder wall.

2. A hydraulic cylinder seal to prevent fluid from passing between the walls of a hydraulic cylinder and a ram member movable therein comprising non-metallic, extrudable packing means supported between the ram member and a first cylinder wall, bushing means mounted between the ram member and a second cylinder wall radially spaced from the first wall and forming a tight fit with the second cylinder wall, and retaining flange means positioned between the bushing means and the packing means extending between the ram member and the first cylinder wall and forming a tight fit with the first cylinder wall so as to prevent the packing means from being extruded between the flange means and the first cylinder wall.

3. A hydraulic cylinder seal to prevent fluid from passing between the walls of a hydraulic cylinder and a ram member movable therein comprising non-metallic, extrudable packing means supported between the ram member and a first cylinder wall, bushing means mounted between the ram member and a second cylinder wall spaced from the first, retaining flange means integral with the bushing means positioned between the bushing means and the packing means and forming a press fit with the first cylinder wall so as to prevent the packing means from being extruded between the flange means and the first cylinder wall, and a junction connecting the retaining flange means and the bushing means thinner than either the flange means or the bushing means to provide flexibility between the two.

4. A hydraulic cylinder seal to prevent fluid from passing between the walls of a hydraulic cylinder and a ram member movable therein comprising non-metallic, extrudable packing means supported between the ram member and a first cylinder wall, bushing means mounted between the ram member and a second cylinder wall spaced from the first and forming a press fit with the second cylinder wall, retaining flange means integral with the bushing means positioned between the bushing means and the packing means and forming a press fit with the first cylinder wall so as to prevent the packing means from being extruded between the flange means and the first cylinder wall, and a junction connecting the retaining flange means and the bushing means thinner than either the flange means or the bushing means to provide flexibility between the two.

5. A hydraulic cylinder seal to prevent fluid from passing between the walls of a hydraulic cylinder and a ram member movable therein comprising packing means supported between the ram member and a first cylinder wall, bushing means mounted between the ram member and a second cylinder wall spaced from the first and forming a press fit with the second cylinder wall, and retaining flange means separate from the bushing means positioned between the bushing means and the packing means and forming a press fit with the first cylinder wall.

6. A hydraulic cylinder seal to prevent fluid from passing between the walls of a hydraulic cylinder and a ram member movable therein comprising packing means supported between the ram member and a first cylinder wall, bushing means mounted between the ram member and a second cylinder wall spaced from the first, and compressible retaining flange means positioned between the bushing means and the packing means having a periphery normally larger than that of the first cylinder wall so that it forms a tight fit therewith.

7. A hydraulic cylinder seal to prevent fluid from passing between the walls of a hydraulic cylinder and a ram member movable therein comprising packing means supported between the ram member and a first cylinder wall, bushing means formed in at least two sections mounted between the ram member and a second cylinder wall, and compressible retaining flange means positioned between the bushing means and the packing means having a periphery normally larger than that of the first wall so that it forms a tight fit therewith.

8. A hydraulic cylinder seal to prevent fluid from passing between the walls of a hydraulic cylinder and a ram member movable therein comprising packing means supported between the ram member and a first cylinder wall, bushing means formed in at least two sections mounted between the ram member and a second cylinder wall, flexible retaining flange means positioned between the bushing means and the packing means formed with a gap to permit compression and having a periphery normally larger than that of the first wall to provide a tight fit therewith, and key means positioning the retaining flange means with respect to the bushing means so that the gap is held adjacent one of the sections thereof.

9. A hydraulic cylinder seal according to claim 8 wherein the retaining flange means is formed of at least two portions adapted to be joined after inserting them into the hydraulic cylinder.

References Cited in the file of this patent

UNITED STATES PATENTS

| | | |
|---|---|---|
| 2,234,142 | Janney et al. | Mar. 4, 1941 |
| 2,635,021 | Alward | Apr. 14, 1953 |